United States Patent [19]

Maekawa et al.

[11] Patent Number: 5,300,980
[45] Date of Patent: Apr. 5, 1994

[54] CONTROL APPARATUS OF COPYING MACHINE WITH IMPROVED COMMUNICATION FUNCTION FOR CENTRALIZED CONTROL UNIT

[75] Inventors: Kazunobu Maekawa, Toyokawa; Sumiaki Hirata, Aichi; Kenzo Nagata, Okazaki; Yoji Sawada, Gifu; Toru Kirimura, Tsushima; Seiji Watanabe, Ogaki, all of Japan

[73] Assignees: Minolta Camera Kabushiki Kaisha, Osaka; Sanyo Electric Co., Ltd., Moriguchi, both of Japan

[21] Appl. No.: 682,122

[22] Filed: Apr. 8, 1991

[30] Foreign Application Priority Data

Apr. 10, 1990 [JP] Japan .................................. 2-95263
Apr. 10, 1990 [JP] Japan .................................. 2-95264

[51] Int. Cl.⁵ ...................... G03G 21/00; H04M 11/00
[52] U.S. Cl. .................................... 355/204; 355/205; 371/29.1; 379/106
[58] Field of Search ............... 355/202, 203, 204, 205, 355/206, 207; 364/184, 185, 186; 371/29.1; 379/106

[56] References Cited

U.S. PATENT DOCUMENTS

| | | | |
|---|---|---|---|
| 3,997,873 | 12/1976 | Thornton | 340/149 R |
| 4,167,322 | 9/1979 | Yano et al. | 355/204 X |
| 4,322,813 | 3/1982 | Howard et al. | 364/900 |
| 4,361,851 | 11/1982 | Asip et al. | 358/84 |
| 4,390,953 | 6/1983 | Johnstone | 364/474 |
| 4,497,037 | 1/1985 | 364 | 900/4,583,834 |
| 4,549,044 | 10/1985 | Durham | 179/5 R |
| 4,583,834 | 4/1986 | Seko et al. | 355/206 |
| 4,739,366 | 4/1988 | Braswell et al. | 355/208 |
| 4,766,548 | 8/1988 | Cedrone et al. | 379/106 X |
| 4,797,706 | 1/1989 | Sugishima et al. | 355/200 X |
| 4,893,248 | 1/1990 | Pitts et al. | 364/464.01 |
| 4,979,132 | 12/1990 | Sugimoto | 364/520 |
| 4,994,926 | 2/1991 | Gordon et al. | 358/400 |
| 4,996,703 | 2/1991 | Gray | 379/40 |
| 5,057,866 | 10/1991 | Hill, Jr. et al. | 355/203 X |
| 5,077,581 | 12/1991 | Suzuki | 355/200 |
| 5,077,582 | 12/1991 | Kravette et al. | 355/206 |
| 5,081,680 | 1/1992 | Bennett | 380/50 |
| 5,084,875 | 1/1992 | Weinberger et al. | 355/205 X |
| 5,138,618 | 8/1992 | Honda et al. | 371/16.4 |
| 5,157,716 | 10/1992 | Naddor et al. | 379/106 X |
| 5,184,179 | 2/1993 | Tarr et al. | 355/206 |
| 5,214,772 | 5/1993 | Weinberger et al. | 395/575 |
| 5,216,461 | 6/1993 | Maekawa et al. | 355/202 |
| 5,220,380 | 6/1993 | Hirata et al. | 355/204 |

FOREIGN PATENT DOCUMENTS

54 42559 8/1984 Japan .
60-90460 5/1985 Japan .
63-301667 12/1988 Japan .

OTHER PUBLICATIONS

Research Newsletter, Dataquest, "Remote Diagnostic-Tool Kit of the Future", 1989, pp. 1-6.

Primary Examiner—A. T. Grimley
Assistant Examiner—Nestor R. Ramirez
Attorney, Agent, or Firm—Burns, Doane, Swecker & Mathis

[57] ABSTRACT

A control apparatus according to the present invention is a control apparatus collecting data related to copying machines and communicating with a centralized control unit on the basis of the data collected, including a communication device for calling the centralized control unit, a determination device for determining that connection with the centralized control device can not be made in spite of the fact that the communication device is activated, a setting device for setting a retransmission time on the basis of a random number in a predetermined time period in response to a determination output of the determination device, a timer device for counting the present time, and a control device for having the communication device call the centralized control unit again when the present time becomes the retransmission time.

11 Claims, 21 Drawing Sheets

DISCHARGE CODE : A SHEET OF PAPER
DISCHARGE =
TRAILING EDGE OF b0

JAM CODE : b7 = 1, b6 = 0
TROUBLE CODE : b7 = 1, b6 = 1

CONTROL APPARATUS OF COPYING MACHINE WITH IMPROVED COMMUNICATION FUNCTION FOR CENTRALIZED CONTROL UNIT

BACKGROUND OF THE INVENTION

1. Field of the Invention

The present invention relates to copying machine control apparatus, and to copying machine control apparatus for transmission of data for controlling copying machines to a centralized control unit on the center side and the like.

2. Description of the Related Art

A system for management of a plurality of copying machines is disclosed in U.S. Pat. No. 4,583,834. In the disclosed system, various operating data of the copying machine such as a total number of copies, machine malfunctions and amounts of remaining copy sheets and toner are transmitted to a computer through a communication network. The computer processes the transmitted data and feeds back to the copying machine instructions.

In a system in which data of copying machines are transmitted from respective terminal devices to a centralized management unit through a communication network such as a public telephone network, connection between the terminal device and the management unit sometimes can not be made.

For example, it is when the network connection can not be made because of overlapping dialing from a number of terminal devices, or when some operational fault occurs in the control unit on the center side.

In such cases, it is generally desirable to re-dial after a predetermined time period.

However, general communication terminal devices and lines such as telephone machines and facsimile apparatus are shared as above-mentioned terminal devices and networks in many cases.

In this case, excessive repeat of above re-dialing because of situations on the center side limits use of a telephone machine and so forth on the user, which is not preferable.

To deal with trouble occurrence is one of objects of a system in which control data for a plurality of copying machines are transmitted from respective terminal devices to the control center side through a line such as a communication network (a public telephone lines) for centralized control.

That is, in the above-mentioned system, when a trouble occurs in a copying machine, the information thereof is immediately transmitted to the control center, where dispatch of a serviceman or instructions to the user by way of the communication line and the like are conducted.

Depending on circumstances, however, the above-mentioned measures are not required. For example, it is when the user knows how to deal with the trouble very well and can deal with it by himself, or when a serviceman has been already dispatched by a request through a telephone or the like.

SUMMARY OF THE INVENTION

It is an object of the present invention to enhance a line connection rate in a control apparatus communicating with a centralized control unit.

It is another object of the present invention to reduce a frequency of re-dialing when line connection can not be made in a control apparatus communicating with a centralized control unit.

It is still another object of the present invention to effectively deal with trouble occurrence in a control apparatus communicating with a centralized control unit.

In order to achieve the above objects, a control apparatus according to one aspect of the present invention is a control apparatus which collects data about copying machines and communicates with a centralized control unit on the basis of the collected data, including communicating means for calling the centralized control unit, determination means for determining that connection with the centralized control unit can not be made although the communicating means is activated, setting means for setting retransmitting time on the basis of a random number from a predetermined time period in response to an output of the determining means, time counting means for counting the current time, and control means for having the communication means call the centralized control unit again when the current time is the retransmitting time.

In the control apparatus configured as described above, the retransmitting time is set on the basis of the random number, so that the line connection rate with the centralized control unit is enhanced.

In order to attain the above objects, a control apparatus in accordance with another aspect of the present invention is a control apparatus which collects data about copying machines and communicates with a centralized control unit on the basis of the collected data, including communicating means for calling the centralized control unit, first receiving means for receiving first data indicating occurrence of a trouble from a copying machine, second receiving means for receiving second data indicating that a predetermined switch is operated corresponding to the trouble, and control means for activating the communicating means in response to receipt of the first data and the second data.

In a control apparatus configured as described above, the communicating means is activated in response to receipt of the first data and the second data, so that efficient communication is enabled.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described below.

[1] Configuration of System

First, a system configuration including "a copying machine, DT (a data terminal), a network (a public telephone line), a center" will be described.

Figure 1:
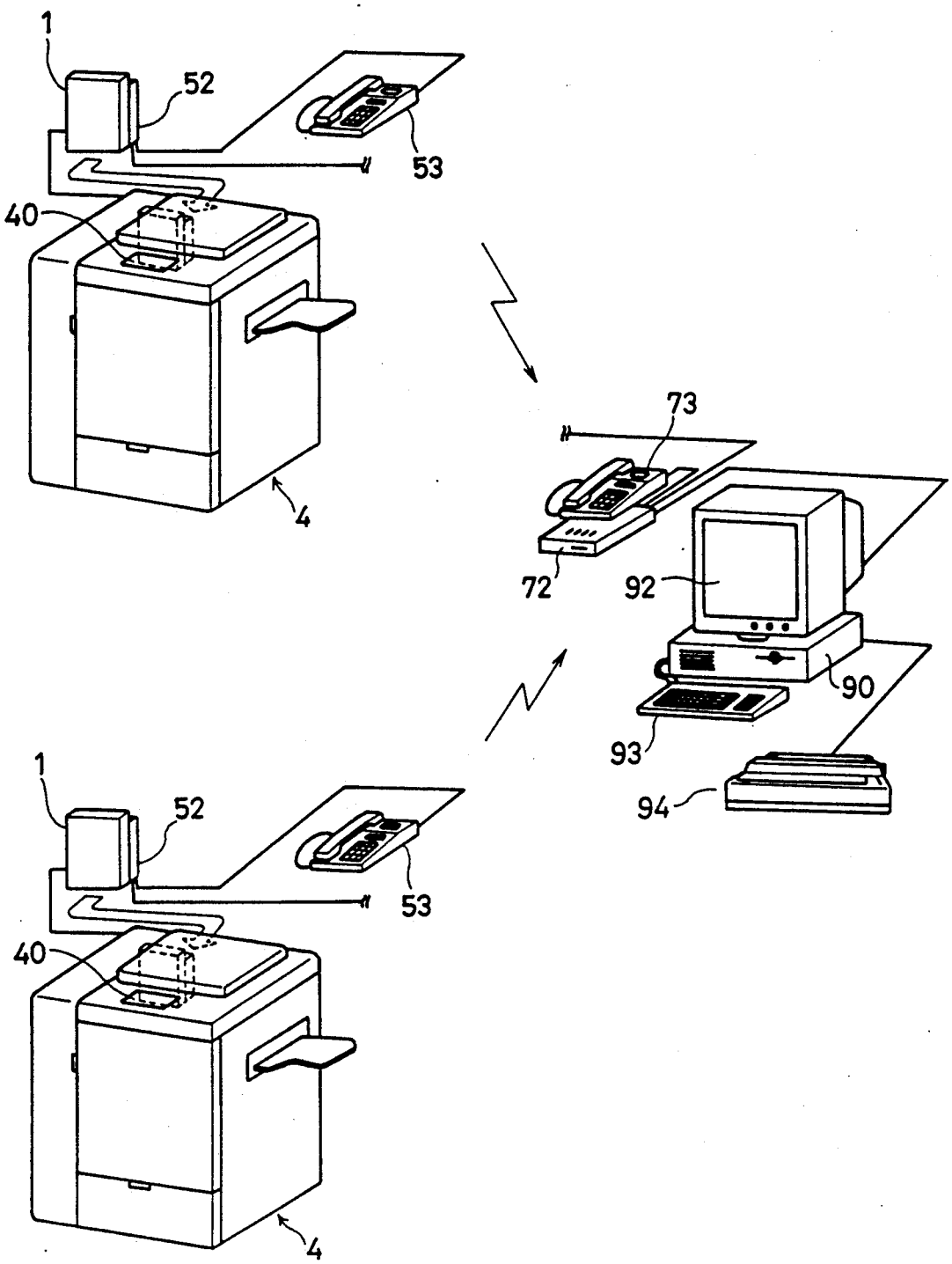
FIG. 1 is a diagram showing a configuration of a copying machine control system in accordance with one embodiment of the present invention.
Figure 2:
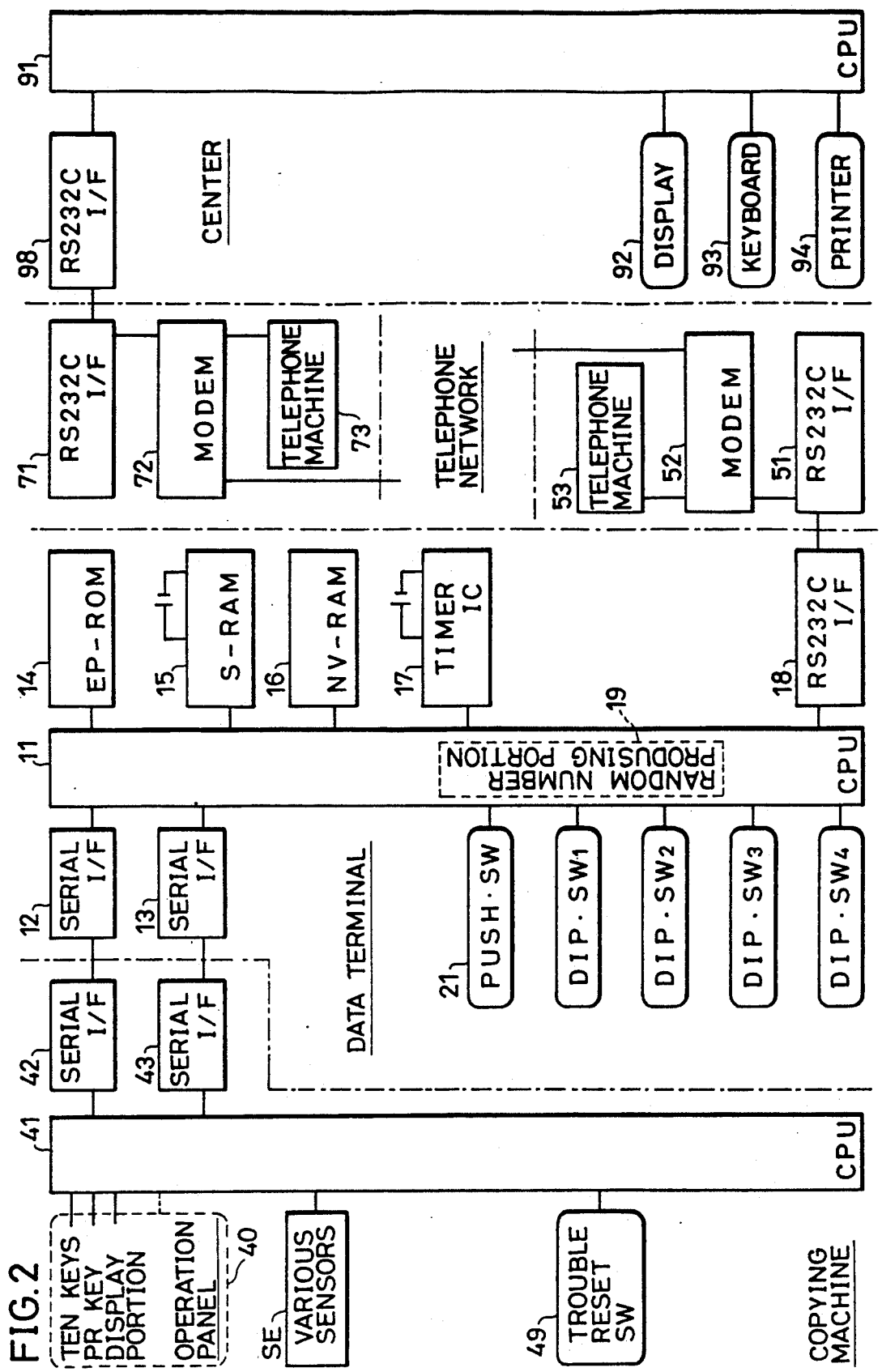
FIG. 2 is a block diagram showing a circuit configuration of the system shown in FIG. 1.

FIG. 1 is a schematic diagram for describing the configuration of the above system, and FIG. 2 is a block diagram of a circuit configuration of the system. In FIG. 2, the relationship between one apparatus on the user side and an apparatus on the center side is shown.

As shown in the figure, the present system includes a plurality of machines on the user side, an apparatus on the center side which is a management base, and a network connecting the above.

At each user, a copying machine 4, a DT (Data Terminal) 1, a modem 52 as a communication terminal device, and a telephone machine 53 as a common communication device are provided.

On the other hand, at the center which is a management base, a modem 72 as a communication terminal device, a telephone machine 73 as a common communication device, and a computer 90 (a main body, a display 92, a keyboard 93 and a printer 94) are provided.

Each of DTs 1 is a device for taking in various information of each of copying machines 4, applying predetermined processes to the same, and transmitting the same to computer 90 on the center.

On the other hand, on the center, data for controlling each of the copying machines is produced based on the transmitted data to carry out required processes.

Respective devices at each user and devices on the center will be described below.

Copying Machine 4

Copying machine 4 is an apparatus for forming a copied image on paper by original image scanning.

In copying machine 4, various kinds of element data having effects upon the image forming process (a time required for paper transport, a surface potential of a photoreceptor drum, a toner concentration in a developer, an amount of exposure of the photoreceptor drum, a developing bias voltage, an amount of toner sticking on photoreceptor drum, a grid voltage of a corona charger, etc.) are detected by a group of various sensors SE, which are taken in and processed in CPU 41, and then transmitted to CPU 11 of DT 1 through a serial I/F43 and a serial I/F13. The above-described various kinds of element data are expressed in an abstract manner as element data $X_i$ ($i=1$ —the number of items of the element data) in the description of flow charts described later.

In copying machine 4, each of counted values is counted in each counter as a base of an amount of charge asked from the management side (a total counter indicating the number of times of paper discharge and a counter for each paper size indicating the number of sheets used for each paper size), counters as criteria for maintenance (a JAM counter for each portion indicating the number of jams for each portion, a trouble counter for each portion indicating the number of troubles for each portion, and a PM counter for each part indicating the number of times each part is used), and transmitted to CPU 11 of DT 1 through serial I/F42 and serial I/F12. The PM counter is a counter for counting the number of times each part is used, which is a criterion of the time for parts replacement.

Figure 4:
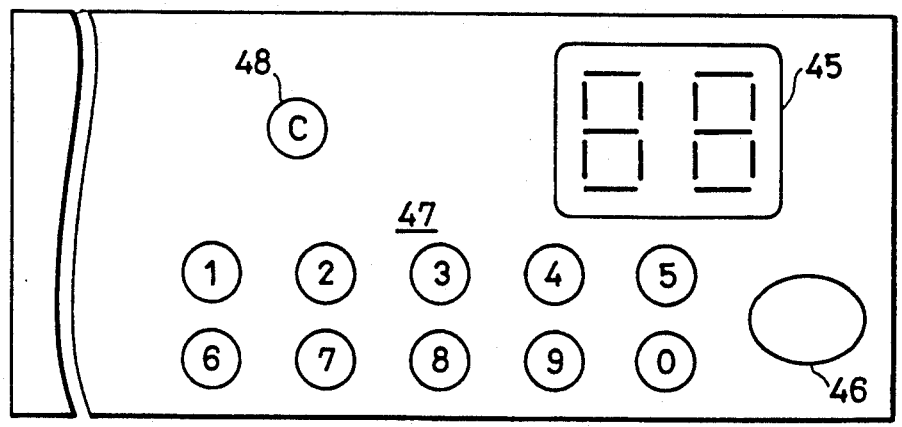
FIG. 4 is a diagram showing contents of an operation panel of the copying machine shown in FIG. 1.

Also, copying machine 4 performs predetermined operation/mode settings with signals from various kinds of key switches on the operation panel (FIG. 4) (a print (PR) key 46 for commanding start of copying operation, a group of ten keys 47 for numerical input, a clear key 48 for commanding to clear input data, etc.), various kinds of switches out of the operation panel (a trouble reset switch 49 for commanding reset of troubles, etc.), and transmits a corresponding signal as needed to CPU 11 of DT 1 through serial I/F 42 and serial I/F12. Numerical data displayed in display portion 45 is also included in the transmitted data.

DT 1

DT 1 is a device for taking in data of copying machine 4 and activating modem 52 under a predetermined condition (a condition in which a transmission flag is set to "1") to connect a line to the center side for transmitting data for controlling the copying machine (the above element data, the count data, etc.) to CPU 91 on the center.

A ROM 14 in which a control program is stored, a non-volatile memory 16 for storing number data (described later) and so forth, a system RAM 15 for works backed up by a battery, and a timer IC 17 similarly backed up by a battery are connected to controlling CPU 11 of DT 1.

Figure 5:
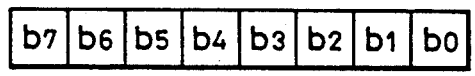
FIG. 5 is a diagram showing a configuration of data transmitted from the copying machine to the control unit of FIG. 1.

As described above, CPU 11 takes in the data from copying machine 4 from serial I/F12 or serial I/F13 and performs predetermined processes. CPU 11 also performs predetermined operations and mode setting and the like corresponding to input of operation switches. Such processes will be described with respect to the description of flow charts. FIG. 5 is a diagram showing the data configuration of a paper discharge code, a JAM code and a trouble code which are data inputted through serial I/F12. The paper discharge code is expressed by a trailing edge (a change of the bit data from "1" to "0") of a bit $b_0$, and the JAM code is expressed as bit $b_7=1$, $b_6=0$. The trouble code is expressed as bit $b_7=1$, $b_6=1$.

Figure 3:
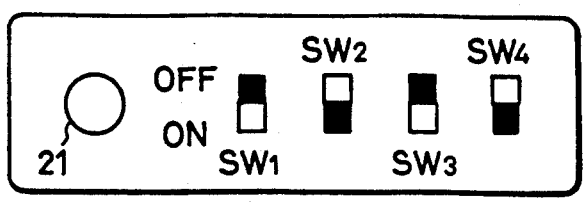
FIG. 3 is a diagram showing contents of operation switches of the control apparatus shown in FIG. 1.

As above-mentioned operation switches, as shown in FIG. 3, four dip switches DIP·SW1—DIP·SW 4 and a push switch 21 are provided.

DIP·SW4 is a switch for setting an initialization mode. DIP·SW1 is a switch for setting a center selection number (telephone number) input mode, DIP·SW2 for an ID number (DTID) input mode for distinguishing DTs 1, and DIP·SW3 for an ID number (center ID) input mode for distinguishing a center, respectively. Push switch 21 is a switch for commanding initialization transmission (refer to S145 in FIG. 8), etc.

The CPU 11 is connected to communication I/F (RS232CI/F) 51 of modem 52 through communication I/F (RS232CI/F) 18.

That is, it is configured to be able to communicate with computer 90 at the center by connecting a line with modem 72 on the center side by commanding transmission of an off-hook signal and a center selection signal to modem 52 through these equipments.

The contents of data transmitted from DT 1 to the center side (the data for controlling copying machine 4) are determined according to a type of a transmission flag set to "1" as will be described later.

Center

The center is a computer equipment configured so that it can be connected to a large number of DTs through a communication network, which is an apparatus for controlling copying machines corresponding to above-mentioned a number of DTs in a centralized manner.

That is, controlling data indicating conditions of a copying machine to which a DT is connected is produced based on data inputted in CPU 91 (the above-mentioned element data, count data, etc.) through the communication network, modem 72, a modem side communication I/F (RS232CI/F) 71 and a computer side communication I/F (RS232CI/F) 98 from each DT side.

A bill is printed out on the basis of the controlling data, and determinations as to whether a serviceman should be dispatched or not, as to which parts are to be prepared in the dispatch and the like are made.

After completion of receipt of data from each DT side, data are transmitted from CPU 91 to each of the DT sides. The details thereof will be described in the description about flow charts.

[2] System Control

Next, control of a system including "copying machines, a DT, (a communication network) and a center" will be described.

Before describing flow charts, the terms "on edge" and "off edge" are defined.

The "on edge" is defined to mean a condition change in which conditions of a switch, a sensor, a signal or the like changes from an off state to an on state.

The "off edge" is defined to means a condition change in which a state of a switch, a sensor, a signal or the like changes from an on state to an off state.

Processes in Copying Machine

Figure 6:
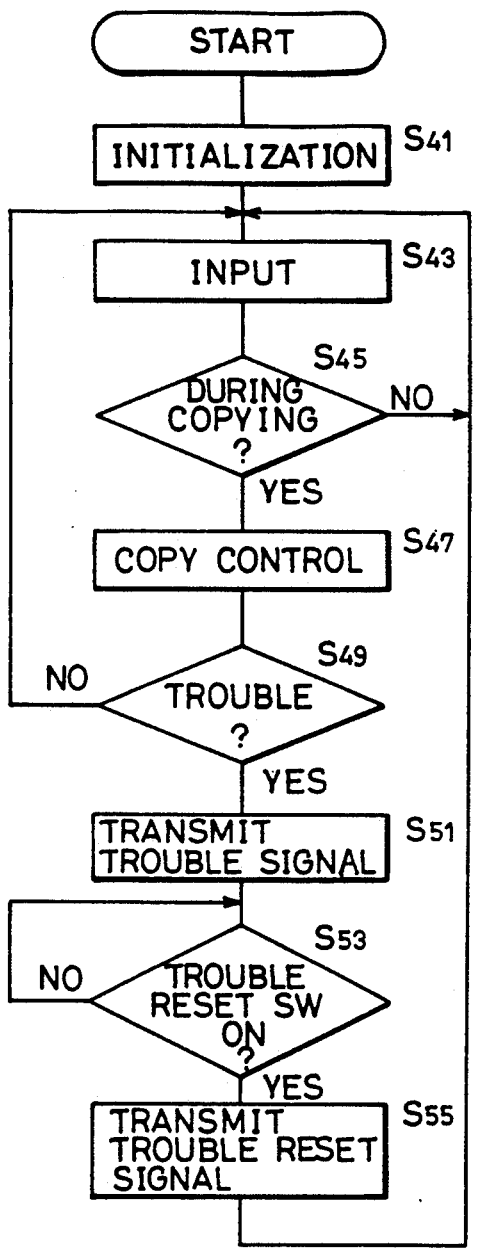
FIG. 6 is a flow chart showing processes performed by a controlling CPU of the copying machine shown in FIG. 1.

First, the processes in control CPU 41 of a copying machine will be described referring to the flow chart of FIG. 6.

CPU 41, for example, starts processing upon turn-on of a power source, makes initialization such as memory clear, standard mode setting or the like (S41), and subsequently, carries out the processes in steps S43–S49.

Step 43 is an accepting process for input signals from a group of key switches on operation panel 40 (a group of ten keys 47 for numerical input, a print (PR) key 46 for copy start command, a clear key 48 for set number clear command, etc.), a group of switches such as a trouble reset switch 49, and a group of sensors (not shown) provided in a copying machine. Step S47 is a step collectively indicating processes necessary for copying operation and so forth, which are paper feed control, scanning control, photoreceptor drum control, and developing device control, for example.

When a trouble such as JAM occurs (YES in S49), a signal corresponding to that trouble is transmitted to controlling CPU 11 of the DT (S51). Further more, when trouble reset switch 49 is operated by an operator or the like (YES in S53), similarly to the above description, a trouble reset signal is transmitted to controlling CPU 11 of the DT (S55).

Processing in Data Terminal

Processes in controlling CPU 11 of a DT will be described referring to the flow charts shown in FIGS. 7–16.

(a) Main Routine

Figure 7:
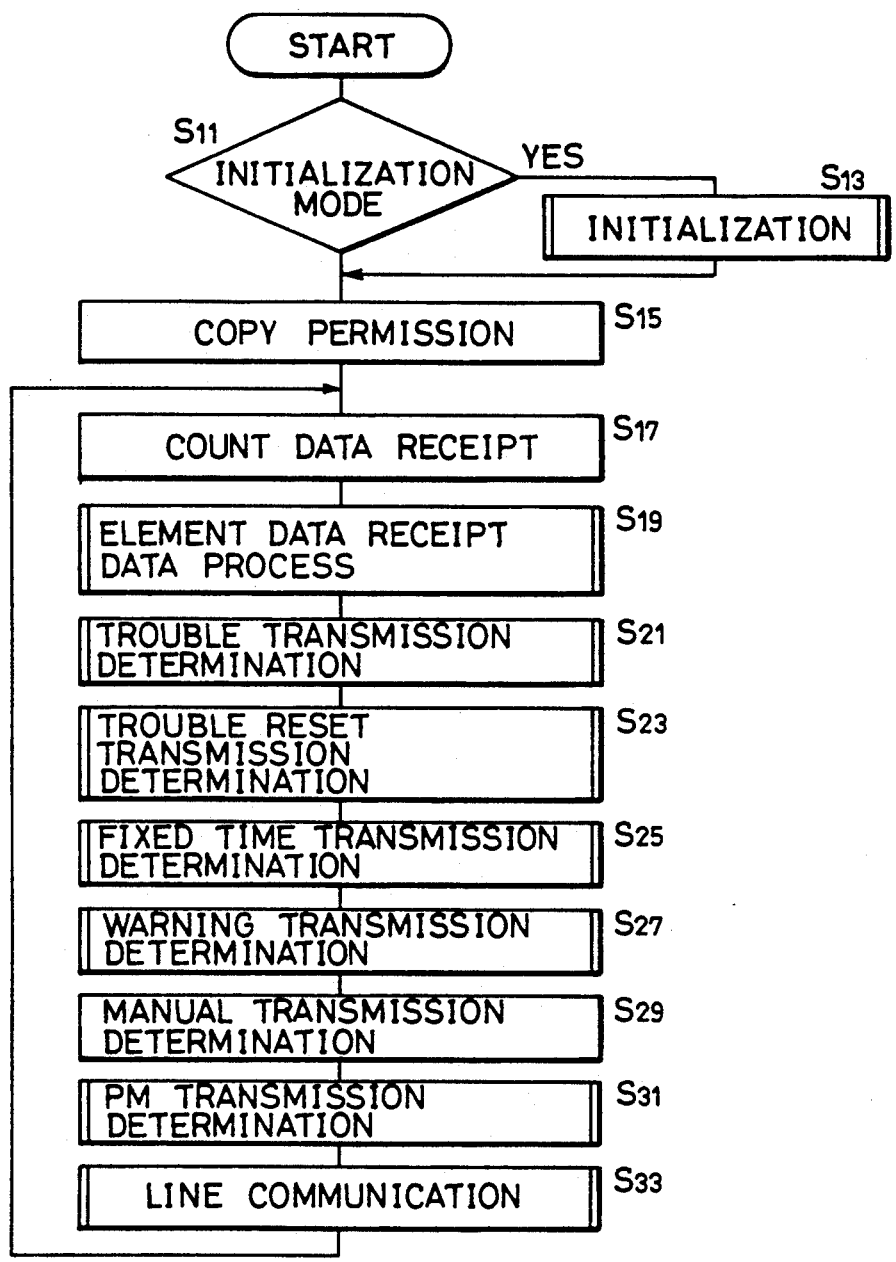
FIG. 7 is a flow chart showing a main routine performed by the controlling CPU of the control unit of FIG. 1.

First, the outline of the processes will be described on the basis of the main routine of FIG. 7.

The controlling CPU 11 starts processing upon turn-on of a power source, carried out an initialization process as required (S13), and then transmits a copy permitting signal to controlling CPU 41 of a copying machine (S15). Subsequently, it proceeds to the repeated loop process of steps S17–S33.

Generally, the following processes are carried out in respective sub routine steps.

* Initialization: S13

Upon turn-on of the power source, when dip switch DIP·SW4 is ON, that is, when it is an initialization mode (YES in S11), this routine is executed. Specifically, as will be described in FIGS. 8A and 8B, a selection number (telephone number) of a center, an ID number of DT (DTID), an ID number of the center (center ID) are set and initialization transmission is performed.

* Count Data receipt: S17

A receiving process of various kinds of count data transmitted from controlling CPU 41 of a copying machine is carried out.

The data contents include a discharge code, JAM and trouble codes, data of JAM and trouble counters, a counter for each paper size and a PM counter.

The controlling CPU 11 of a DT updates such data to the newest values and holds the same.

* Element Data Receipt and Data Process: S19

Figure 9A:
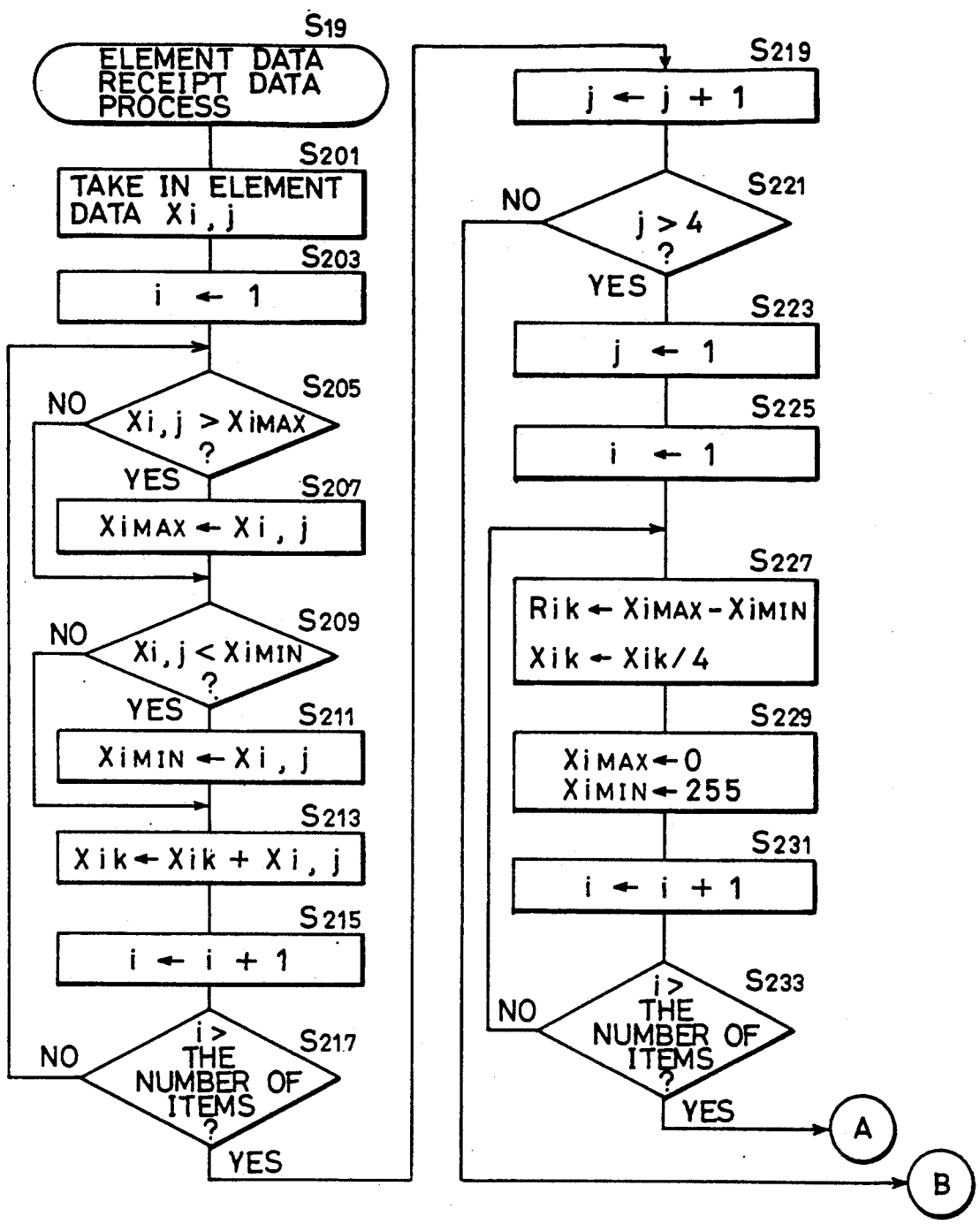
FIGS. 9A and 9B are flow charts showing specific contents of the element data receiving and data processing routines of FIG. 7.
Figure 9B:
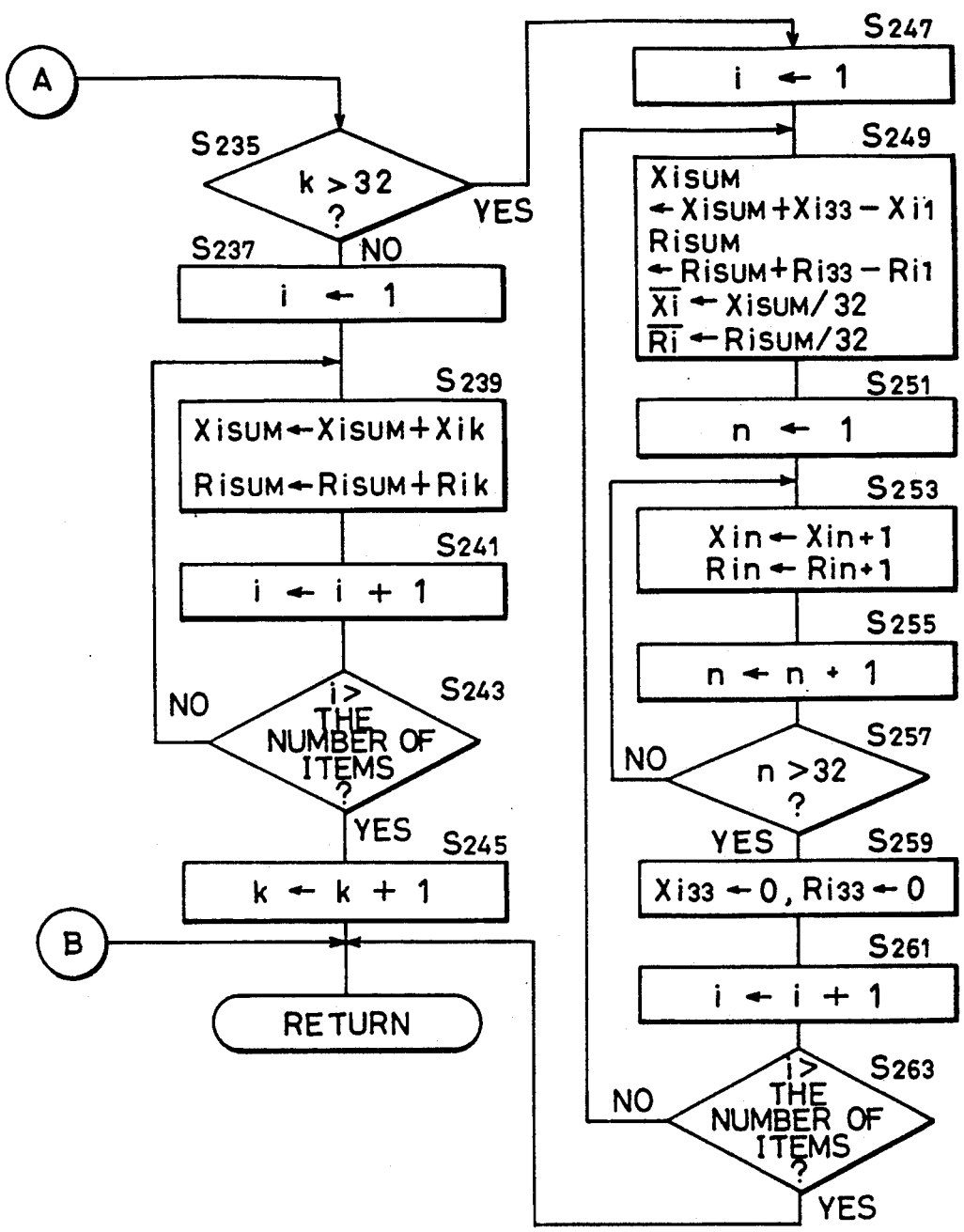

As will be described in FIGS. 9A and 9B, CPU 11 sequentially calculates data corresponding to an average value of each element data and a standard deviation to update them to the newest values.

* Trouble Transmission Determination: S21

As will be described in FIG. 10, a determination is made as to, for example, whether or not the trouble data and trouble recovery data should be transmitted to the center.

* Trouble Reset Transmission Determination: S23

As will be described in FIG. 11, a determination is made as to whether or not the trouble reset data should be transmitted to the center.

* Fixed Time Transmission Determination: S25

As will be described in FIG. 12, a fixed time transmission flag is set to 1 at a predetermined fixed time transmission time and various kinds of count data and various kinds of element data are transmitted to the center.

After completion of transmission by the fixed time transmission, fixed time transmission time data for the next time, current time data and data of the closing date of a bill are transmitted in turn from the center side.

* Warning Transmission Determination: S27

As will be described later in FIGS. 13A and 13B, element data, a counted value of a JAM counter, and a counted value of a PM counter are compared with predetermined threshold values, respectively.

On the basis of the results thereof, a determination is made as to whether or not warning data, warning recovery data should be transmitted to the center.

* Manual Transmission Determination: S29

When it is not in the initialization mode, when push switch 21 is turned on, a manual transmission flag is set to 1.

By this, various count data, various element data are transmitted to the center.

* PM Transmission Determination: S31

As will be described in FIG. 14, a count value before clearing the PM counter in which a count value is cleared to "0" by parts replacement is transmitted to the center.

*Line Communication Process: S33

As will be described in FIGS. 15A and 15B, when any of the transmission flags is set, line connection with the center is commanded, and after connection, the data communication is implemented.

(b) Sub Routine

Next, details of sub routine steps will be described referring to FIGS. 8 to 16.

Figure 8A:
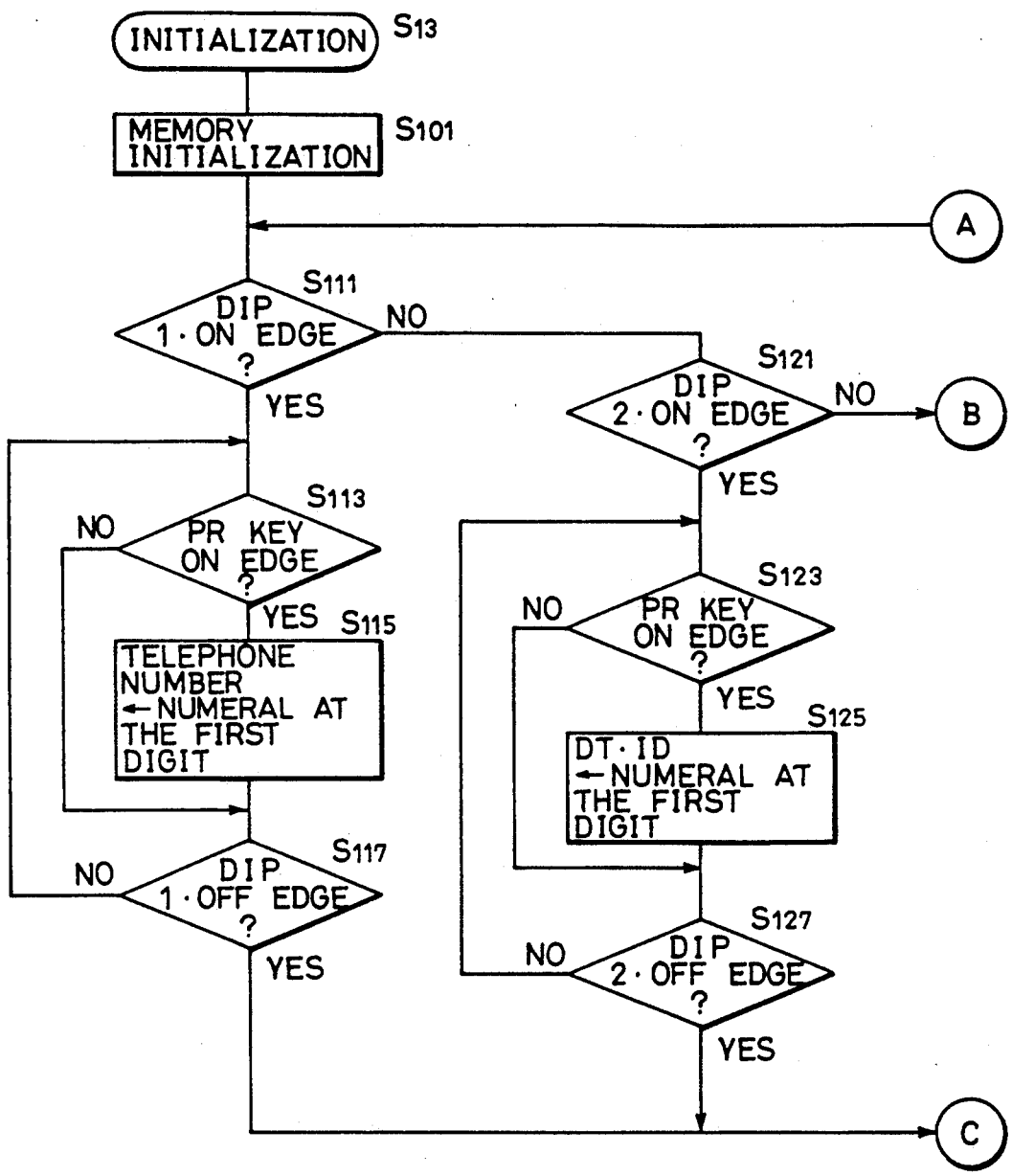
FIGS. 8A and 8B are flow charts showing specific contents of the initialization setting routine of FIG. 7.
Figure 8B:
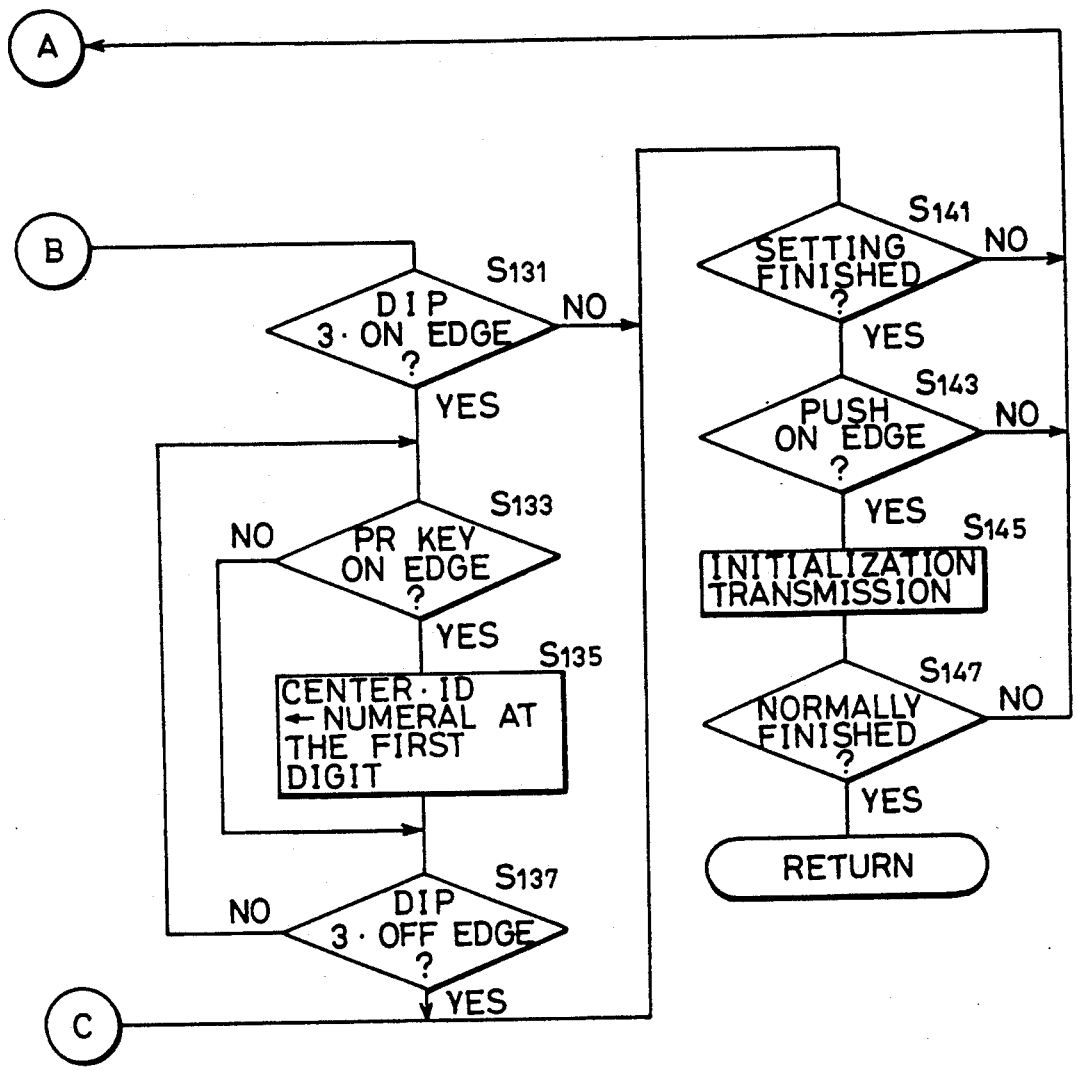

* initialization Process (FIGS. 8A and 8B)

This process is a process carried out when dip switch DIP·SW4 is on in turn-on of the power source (YES in S11), wherein initialization of a selection number of the center, an ID number of a data terminal (DTID) and an ID number of the center (center ID) are accepted, and then initialization transmission is carried out.

First, memory 15 is initialized (S101), and ON of dip switches DIP·SW1 − DIP·SW3 are stood by.

When DIP·SW1 is turned on (YES in S111), an input mode of the selection number (telephone number) is implemented. That is, a figure inputted with ten key 47 of the copying machine and displayed at the first digit of display portion 45 is stored in a nonvolatile memory 16 as selection number data of the center in response to input of print key 46 (YES in S113). The selected number input mode is released with OFF of DIP·SW1 (S117).

Similarly, in response to ON of DIP·SW2 (YES in S121), an input mode of DTID is set, and a figure displayed at the first digit of display portion 45 is stored in nonvolatile memory 16 (S125) as DTID data in response to input of print key 46 (YES in S123). The DTID input mode is released with OFF of DIP·SW2 (S127).

Similarly, in response to ON of DIP·SW3 (YES in S131), an input mode of the center ID is set and a figure displayed at the first digit of display portion 45 is stored in nonvolatile memory 16 as the center ID data (S135) for every input of print key 46 (YES in S133). The center ID input mode is released with OFF of DIP·SW3 (S137).

In this way, when three kinds of data setting have been finished all (YES in S141), push switch 21 is made valid, and upon ON of the push switch 21 (YES in S143), initialization tranmission is made to the center (S145).

That is, CPU 11 calls the center through the communication network to transmit the above two kinds of ID data to CPU 91 of the center. When the transmission is finished, CPU 11 receives the data transmitted from CPU 91 of the center (the closing date of the count data, the next fixed time transmission time, the current time, and a threshold value of a warning determination).

When the above transmission and receipt are finished, a determination is made as to whether the communication has been normally made or not (S147).

As a result, when the communication has not been normally performed (NO in S147), it returns to step S111 and another ON of DIP·SW1 is stood by.

On the other hand, when the communication has been made normally (YES in S147), it returns to the main routine and the processes after step S15 are carried out.

* Element Data Receipt, etc. (FIGS. 9A and 9B)

In this sub routine process, data for comparison with a threshold value (refer to the warning transmission determination routine of FIG. 12) is calculated on the basis of the element data transmitted from a copying machine.

First, a group of element data $X_{ij}$ transmitted from a copying machine for every discharge of copy paper are taken in from serial I/F13 (S201). Here, the subscript i expresses an item number of the element data and the subscript j expresses the order in each item.

Next, after substituting an initial value 1 for the item number i (S203), CPU 11 sequentially updates the maximum value $X_{iMAX}$, the minimum value $X_{iMIN}$ and a sum $X_{ik}$ for each item (S205-S217).

Subsequently, the subscript j is incremented (S219), and when j is less than 4, the flow returns to the main routine.

In this way, when the processes of steps S201-S217 are carried out four times for each time (S221; YES), the subscript j is reset to 1 (S223), an initial value 1 is substituted into the item number i (S225), and the difference $R_{ik}$ between the maximum value and the minimum value and an average value $X_{ik}$ of four pieces of data are respectively calculated for each item (S227-S233). In step S229, initial values of the maximum value $X_{iMAX}$ and the minimum value $X_{iMIN}$ are given for preparation of processes in the next steps S205–S2111.

After the processes of the above S227–S233, the processes of steps S237–S245, or of steps S247–S263 are carried out.

Steps S237–S245 are processes for a case in which the total of the processes of above S227–S233 does not reach thirty three times, wherein a sum $R_{iSUM}$ of the difference $R_{ik}$ between the above-mentioned maximum value and the minimum value and a sum $X_{iSUM}$ of the average value $X_{ik}$ of the above-mentioned four pieces of data are calculated for the data for thirty two times for each item.

Steps S247–S263 are processes for the case in which the total of processes in the above S227–S233 is thirty three times or more, wherein a sum $R_{iSUM}$ of the above difference $R_{ik}$ and a sum $X_{iSUM}$ of the above average value $X_{ik}$ are calculated for the newest data for thirty two times for each item, and also calculating average values $\overline{X}_i$ and $\overline{R}_i$, respectively.

As described above, an average value $\overline{X}_i$ of the newest 128 (=4×32) pieces of data and an average value of deviations (a value corresponding to the standard deviation) $\overline{R}_i$ are obtained for each item of the element data.

Figure 10:
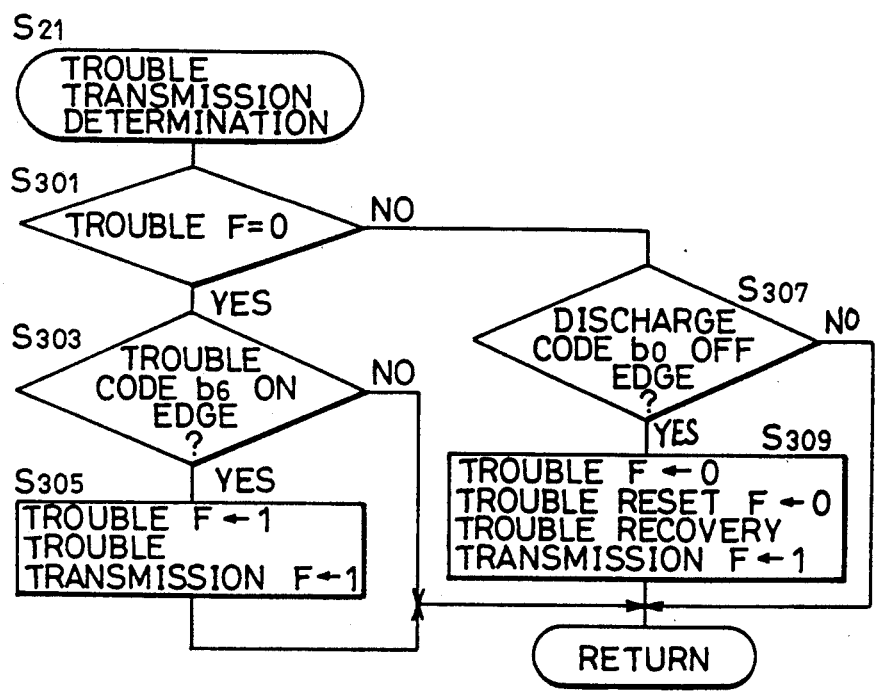
FIG. 10 is a flow chart showing specific contents of the trouble transmission determining routine of FIG. 7.

* Trouble Transmission Determination (FIG. 10)

The process is a sub routine for controlling trouble transmission and trouble recovery transmission.

That is, when "trouble flag=0" (YES in S301), if a trouble code is detected from a copying machine (YES in S303), the trouble flag and a trouble transmission flag are set to "1", respectively (S305).

In a condition of "trouble flag=1" (NO in S301), when a paper discharge code from a copying machine is detected (YES in S307), the trouble flag and a trouble reset flag (refer to FIG. 11), are reset to "0", respectively, and a trouble recovery transmission flag is set to "1" (S309). This is because the paper discharge in a copying machine is an operation to be performed after a trouble is recovered.

Upon setting of the trouble transmission flag and the trouble recovery transmission flag, a line communication process (FIGS. 15A and 15B) is carried out and trouble data and trouble recovery data are transmitted to the center, respectively.

Figure 11:
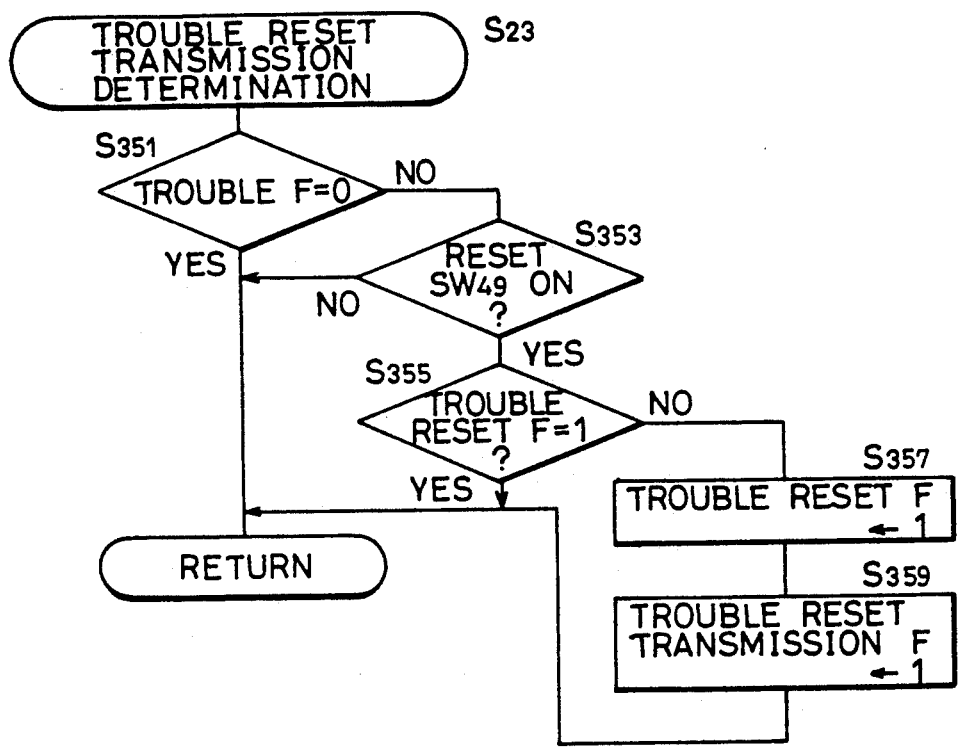
FIG. 11 is a flow chart showing specific contents of a trouble reset transmission determining routine of FIG. 7.

* Trouble Reset Transmission Determination (FIG. 11)

The process is a sub routine for controlling trouble reset transmission.

That is, in a condition of "trouble flag=1" (NO in (S351), when trouble reset switch 49 is turned on (YES in S353), on the condition that a trouble code is not detected again (NO in S355), the trouble reset flag and a trouble reset transmission flag are set to "1", respectively (S357, S359).

When a trouble reset transmission flag is set to "1", the line communication process (FIG. 14) is carried out, and the trouble reset data is transmitted to the center. By this, on the center side, it is recognized that a measure for the trouble has been taken (a measure by a user or the like).

Figure 12:
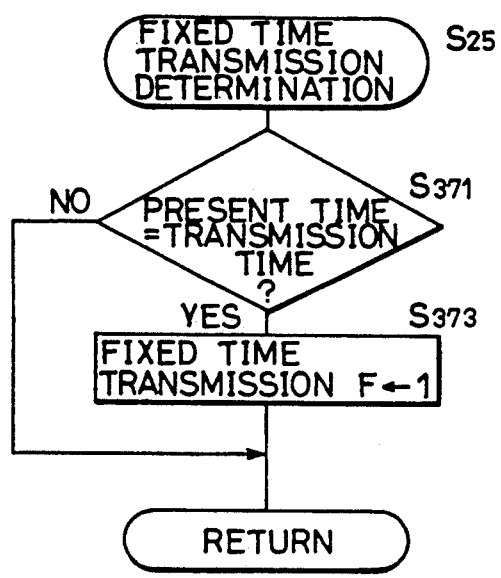
FIG. 12 is a flow chart showing specific contents of the fixed time transmission determining routine of FIG. 7.

* Fixed Time Transmission Determination (FIG. 12)

In this routine, the fixed time transmission is controlled.

That is, when the current time read from timer IC 17 coincides with the fixed time transmission time data transmitted from the center in the communication by the previous fixed time transmission (or in the communication by the initializing transmission of FIGS. 8A and 8B) (YES in S371), the fixed time transmission flag is set to "1" (S373).

Upon setting of the fixed time transmission flag, the line communication process (FIGS. 15A and 15B) is carried out, and the count values of the above-mentioned various counters, and various element data are transmitted to the center. CPU 11 receives from the center the next fixed time transmission time, a closing date, the current time, and a warning determining threshold value (FIGS. 13A and 13B).

Figure 13A:
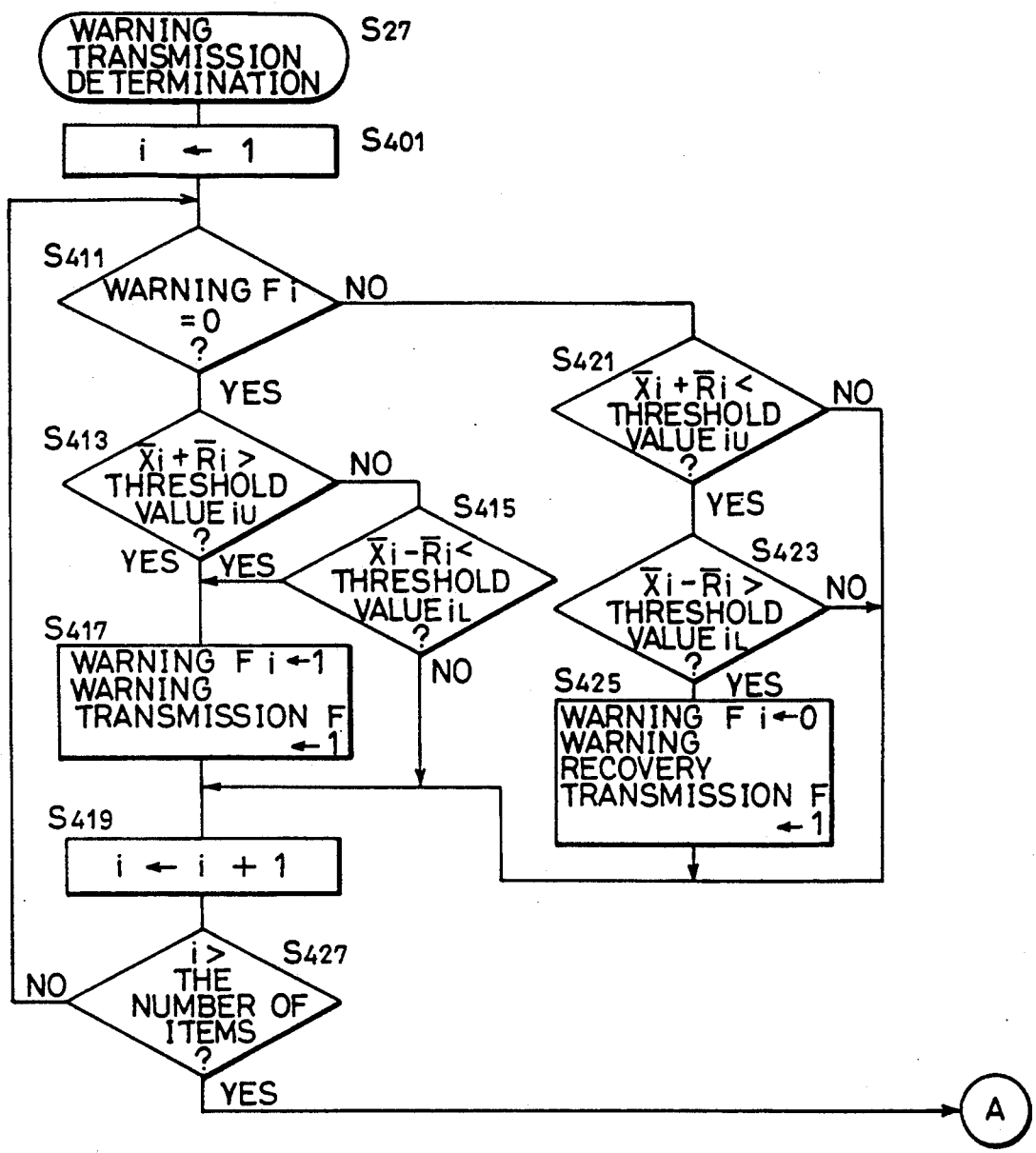
FIGS. 13A and 13B are flow charts showing specific contents of the warning transmission determining routine of FIG. 7.
Figure 13B:
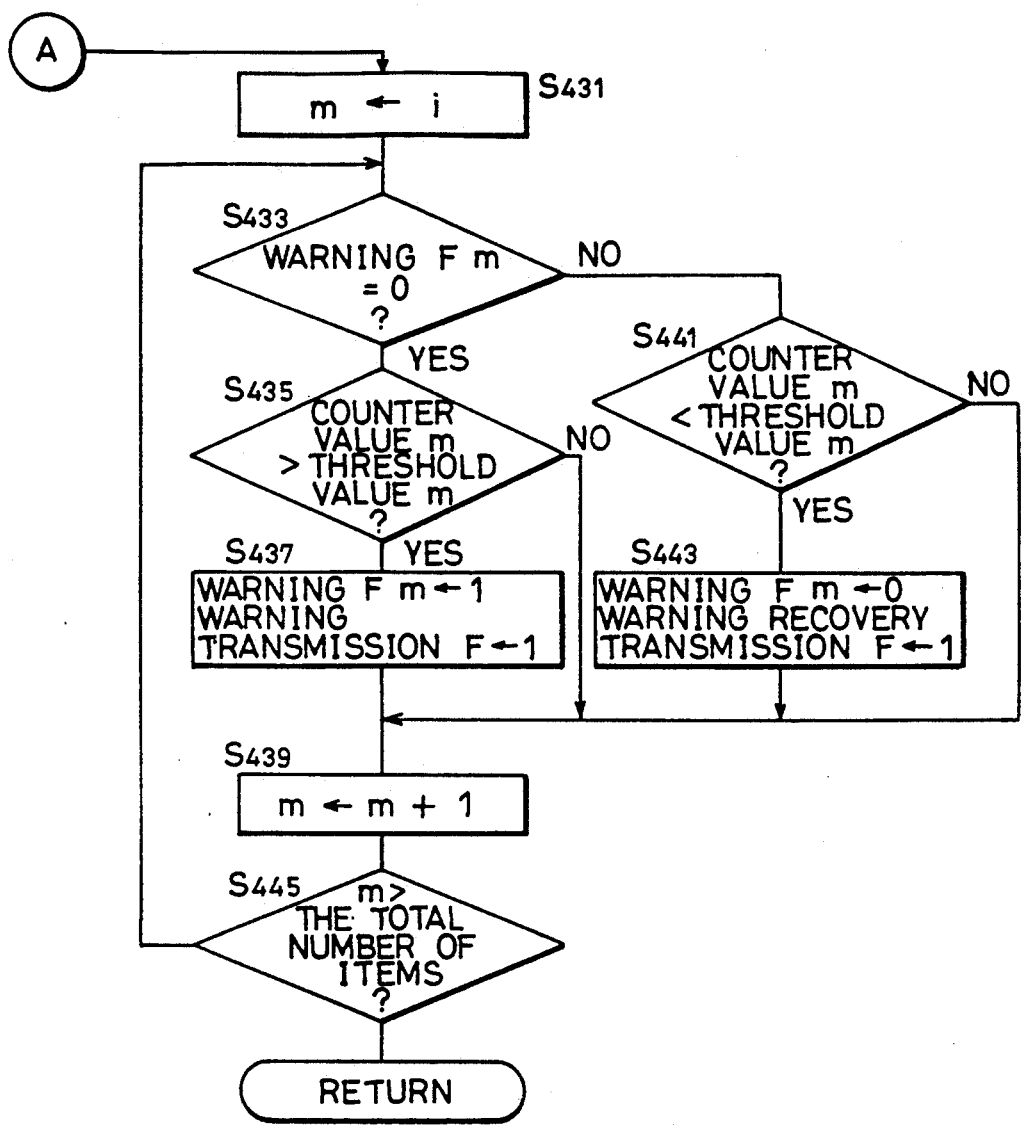

* Warning Transmission Determination (FIGS. 13A and 13B)

In this routine, the warning transmission and so forth are controlled.

Steps S401 through S427 are processes for making warning transmission when a value of element data gets out of a peculiar permittable range, and warning recovery transmission when it recovers into the permittable range, respectively.

First, an initial value "1" is set in the item number i indicating a type of the element data (S401).

Next, in step S411, a warning flag about objective element data (in the first time, the first element data) is examined.

As the result, when the warning flag about the particular element data is "0" (YES in S411), a determination is made as to whether or not the element data value is in the permittable range peculiar to the element data, in other words, whether or not it is in the range not more than an upper limit threshold value $i_u$ and not less than a lower limit threshold value $i_L$. When it is out of the permittable range (YES in S413 or YES in S415), a warning flag $F_i$ about the particular element data and a warning transmission flag are set to "1", respectively (S417). By this, the line communication process (FIGS. 15A and 15B) is carried out and warning data is transmitted to the center.

On the other hand, when a warning flag of the objective element data is "1" (NO in S411), a determination is made as to whether the value of the element data has recovered into the above-mentioned permittable range or not. If it has recovered (YES in S421 and YES in S423), a warning flag $F_i$ about the particular element data is reset to "0", and the warning recovery transmission flag is set to "1". By this, the line communication process (FIGS. 15A and 15B) is carried out, and warning recovery data is transmitted to the center.

After performing such processes until i attains the number of items of the element data, in other words, after performing processes with respect to all the element data, the flow proceeds to the processes after step S431.

Steps S431–S445 are processes for making warning transmission when count values (frequency) of the JAM counter and the PM counter exceed peculiar threshold values, and warning recovery transmission when they recover below the threshold values, respectively.

First, an initial value "i (the last number of the element data +1)" is set in the item number m indicating types of a JAM counter and a PM counter (S431).

Next, in step S433, a warning flag about the objective JAM counter or PM counter is examined.

As a result, when the warning flag about the particular JAM counter or PM counter is "0" (YES in S433), a determination is made as to whether or not the value of the counter is in a permittable range peculiar to the counter, or whether it exceeds the threshold value $m$ or not. When it exceeds the same (YES in S435), the warning flag $F_m$ and the warning transmission flag about the particular counter are set to "1", respectively (S437). By this, the line communication process (FIGS. 15A and 15B) is carried out and warning data is transmitted to the center.

On the other hand, when a warning flag about the objective JAM counter or PM counter is "1" in the above-mentioned S433 (NO in S433), a determination is made as to whether the value of the particular counter has been recovered below the above threshold value or not. In the case of recovery (YES in S441), the warning flag $F_m$ about the particular counter is reset to "0", and the warning recovery transmission flag is set to "1". By this, the line communication process (FIGS. 15A and 15B) is carried out and the warning recovery data are transmitted to the center.

CPU 11 performs such processes until m attains the total number of items of element data and counters, in other words, after performing with respect to all the counters, it returns to the main routine.

As described above, the warning transmission and the warning recovery transmission are controlled.

Figure 14:
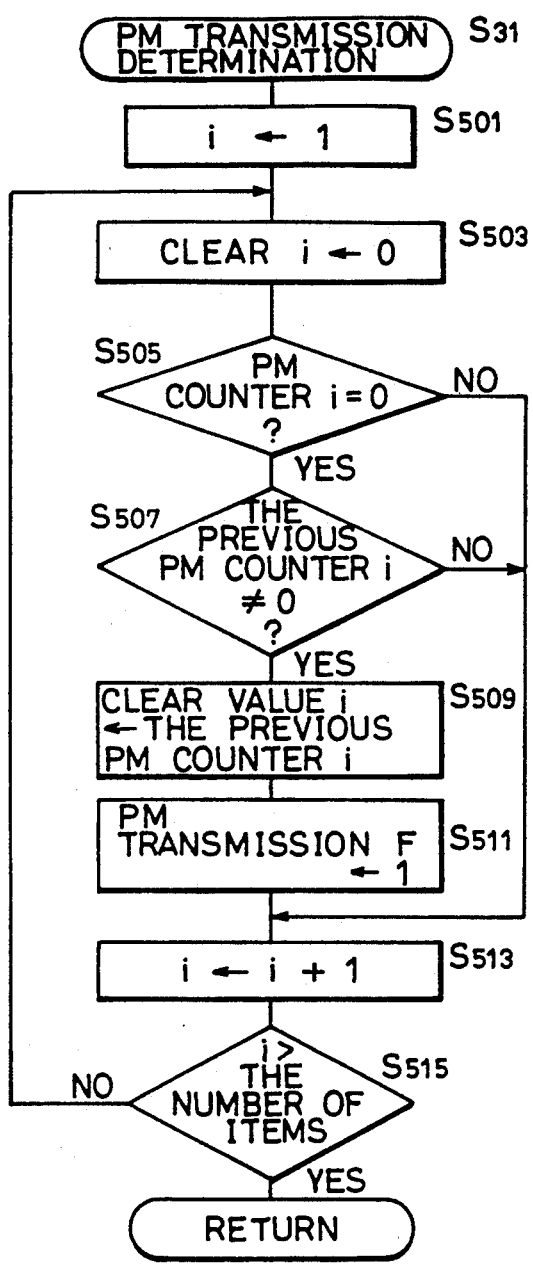
FIG. 14, is a flow chart showing specific contents of the PM transmission determining routine of FIG. 7.

* PM Transmission Determination (FIG. 14)

In this routine, the PM transmission is controlled.

First, an item number i indicating a type of a PM counter is set to an initial value "1" (S501), and after the processes in steps S503-S511 are carried out, the value of i is incremented, that is, changing a type of PM counter, the above processes are repeated.

Here, the processes in the above S503-S511 are processes for retaining a count value immediately before clearing the PM counter (S509) and setting the PM transmission flag to "1" (S511) when the PM counter is cleared (YES in S505 and YES in S507). A PM counter is cleared by a serviceman when replacing parts corresponding to the PM counter.

When "PM transmission flag=1", the line communication process (FIGS. 15A and 15B) is carried out, and the PM data (types of replaced parts, a count value immediately before the replacement) are transmitted to the center.

Figure 15A:
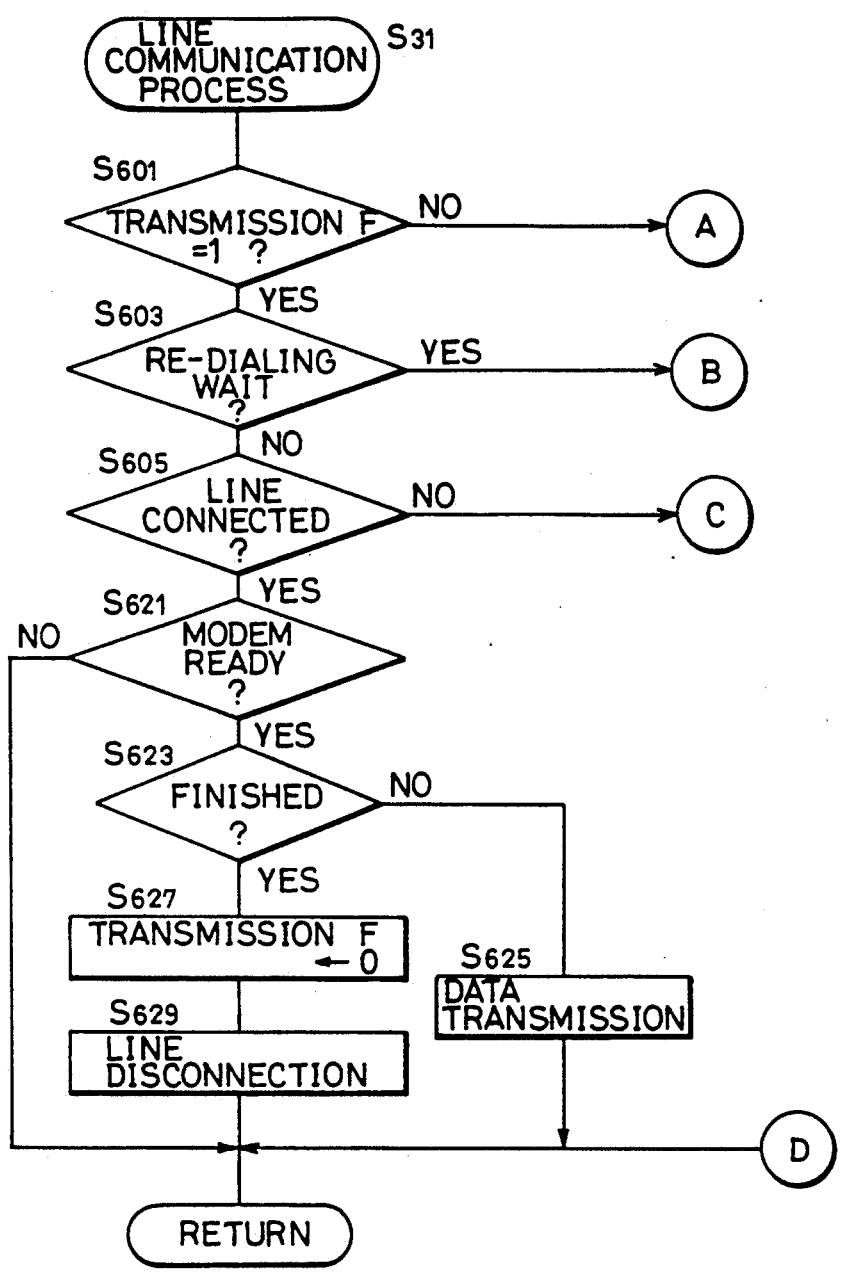
FIGS. 15A and 15B are flow charts showing specific contents of the line communication process routine of FIG. 7.

* Line Communication Process (FIGS. 15A and 15B)

In this routine, the center is called in response to "any of transmission flags=1", and data corresponding to the particular transmission flag is transmitted.

That is, when any of transmission flags is set to "1" (YES in S601), on conditions that it is not in a re-dial standby (NO in S603), the network with the center is not connected (NO in S605), and it is not in a standby state after transmission command of an off-hook signal and a selection signal (NO in S607), transmission of an off-hook signal and a selection signal is commanded to modem 52 (S609).

As the result of the process in the S609, when the telephone machine 53 is "line is busy", and an off-hook signal and a selection signal can not be transmitted accordingly (YES in S611), in order to perform the above-mentioned S609 process again after a predetermined time period, a re-dial time (a time after the above predetermined time period) is set (S613). By this, until the above-mentioned redial time, the determination in the S603 is "YES", and the process of the S609 is not carried out, accordingly. At the redial time, with NO in S603 NO in S605 NO in S607 S609, modem 52 is commanded to transmit an off-hook signal and a selection signal again.

As the result of transmission of the selection signal to the communication network from modem 52 in accordance with the process in the S609, when a determination is made that the modem 72 on the center side is "busy (including a case in which there is no response from CPU 91 even when connection with modem 72 is implemented)" (YES in S615), the redial time process (FIG. 16) is carried out (S617), and the process of the above S609 is carried out again at the time set in the process. The redialing time process (S617) will be described later.

On the other hand, as the result of the transmission of the selection signal to the communication network from modem 52 in accordance with the process of the above S609, when the line is connected with the center side modem 72 (YES in S605), after standing by the ready of modem 52 (YES in S621), the data is transmitted to the center (S625). The transmitted data is data defined by a transmission flag which is set to "1".

In this way, when all the data are transmitted (YES in S623), the above transmission flag is reset to "0" (S627), and also the line with the center side modem 72 is disconnected (S629).

The line communication process is performed as described above, data is transmitted to the center and data from the center are received as needed.

Figure 16:
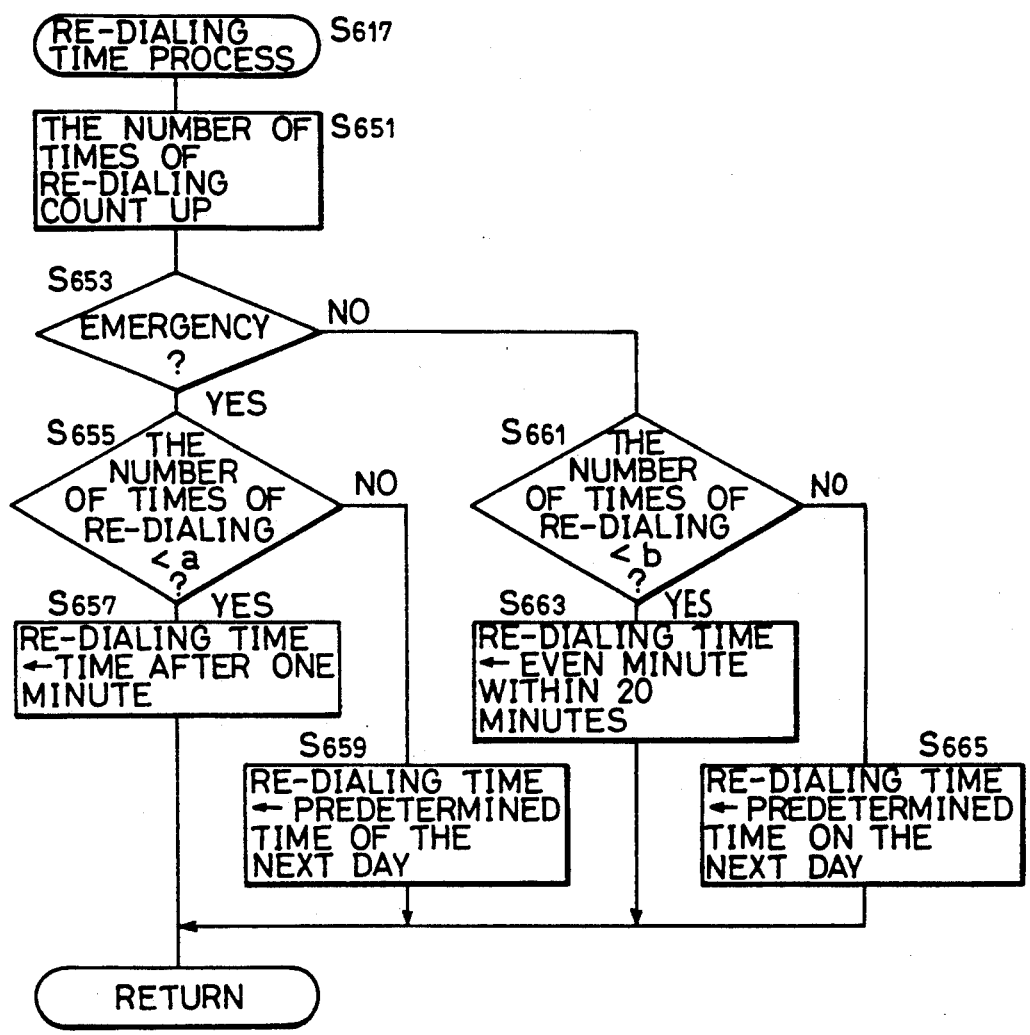
FIG. 16 is a flow chart showing specific contents of the redial time process routine of FIG. 15B.

* Redial Time Process (FIG. 16)

This routine is a process for setting a redialing time when a DT can not be connected to the center due to some conditions in the center.

First, a counter for counting the number of times of redialing (a redial counter) is counted up (S651). The counter is cleared after connection with the center.

Next, a determination is made as to whether the present dialing is a dialing in an emergency mode (in the case of trouble transmission) or not, and if it is the emergency mode (YES in S653), on the condition that a redial counter value is a (=about 10-20 times) or less (YES in S655), the time one minute after the present time is set as the next redialing time (S657). That is, in the case of the emergency mode, the center is called for every minute until the number of times of redialing exceeds a times.

When the number of times of redialing in the emergency mode exceeds a (NO in S655), a predetermined time in the next day is set as a redialing time (S659). The redialing time is set in the next day in order to avoid occupying a telephone of a user when connection to the center can not be made in spite of dialing for a times (abnormally busy network condition, operation stop of the center computer and so forth are possible).

On the other hand, when it is determined that it is not in the emergency mode in the S653 (NO in S653), that is, when it was dialing because of a cause other than trouble transmission, on the condition that the redial counter value is b or less (YES in S661), an arbitrary even minute time within twenty minutes from the present time is set as the next redialing time on the basis of a random number produced in a random number producing portion 19 of CPU 11 (S663). That is, redialing is made one time within twenty minutes. This is done in order to increase the possibility of connecting to the center in the first redialing by dispersing redialing times of respective DTs on the basis of the random numbers when dialing to the center from a large number of DTs are made.

When the number of times of redialing in the non-emergency mode exceeds b (NO in S661), a predetermined time in the next day is set as a redialing time (S665). This is in order to avoid occupying a telephone of a user when making connection to the center is impossible in spite of dialing for b times (abnormally busy network, operational stop of the center computer and so forth are possible).

As described above, a redialing time is set.

Processing in the Center

Figure 17:
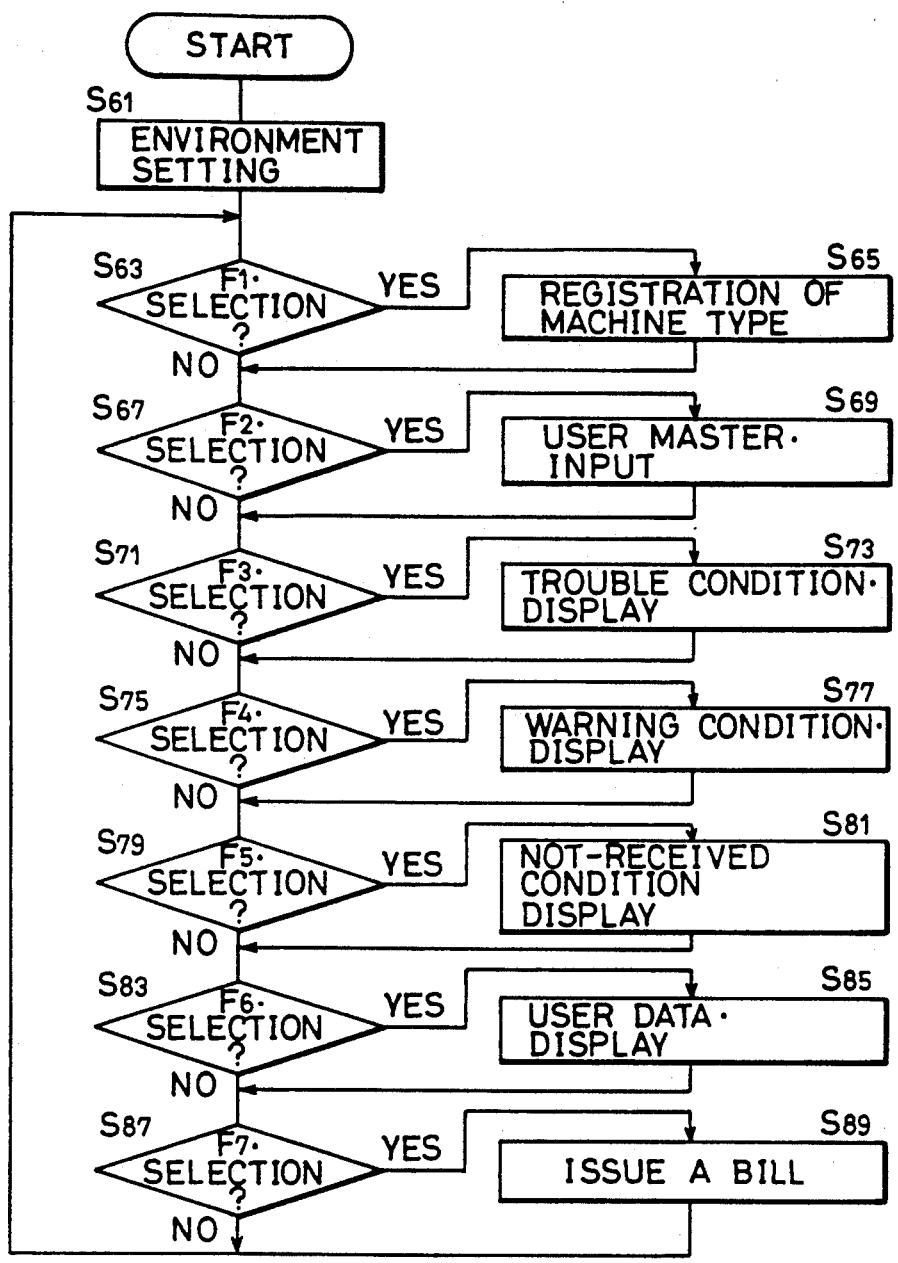
FIG. 17 is a flow chart showing a main routine of the controlling CPU of the centralized control unit of FIG. 1.

Next, the processing in a CPU 91 provided in computer 90 in the center will be described referring to FIGS. 17-19.

Figure 15:
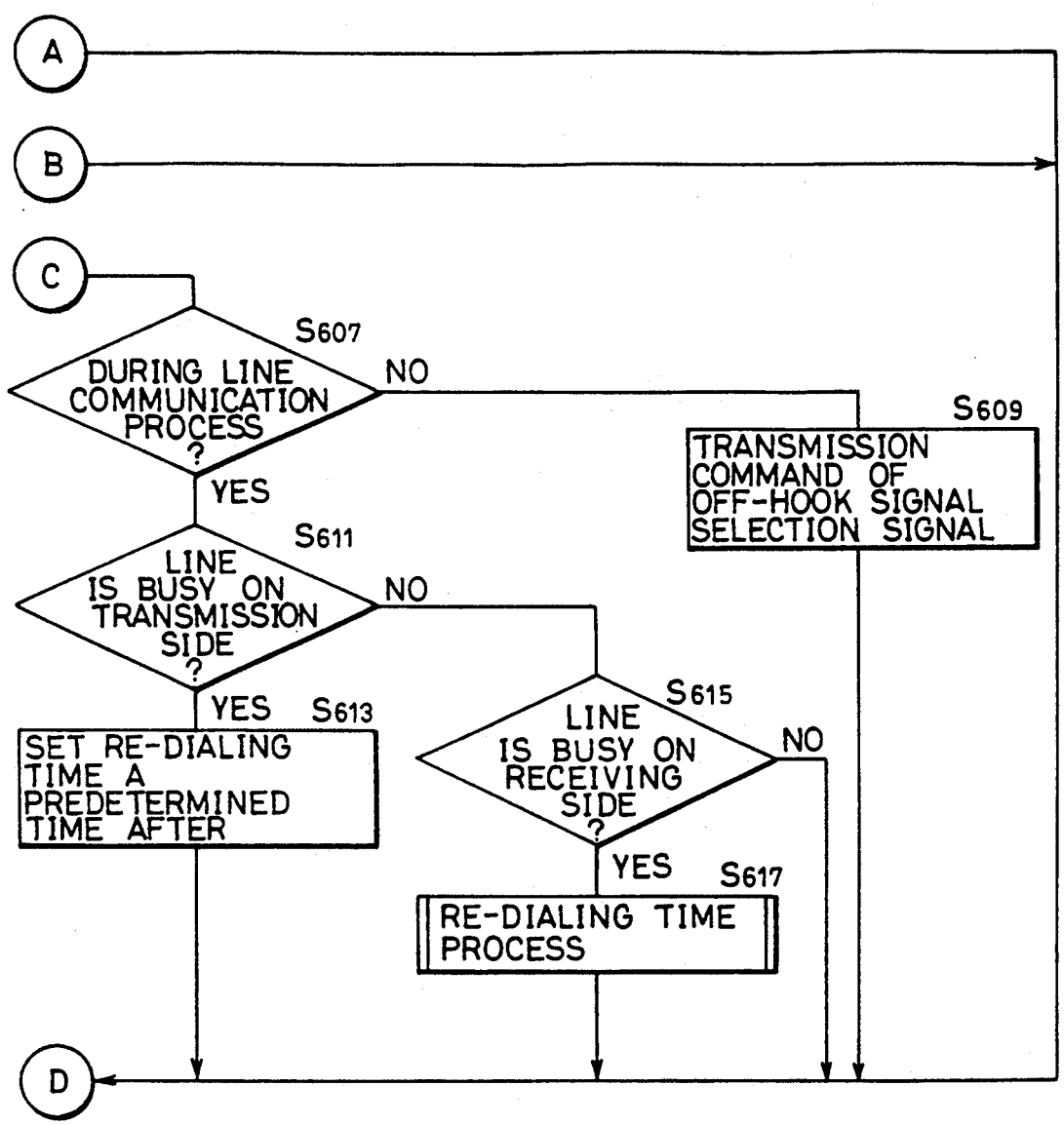

(a) F1-F7 key processes (FIG. 15)

CPU 91 starts processing upon turn-on of a power source, and performs environment setting of a modem, a printer and the like (S61). Subsequently, in response to input operation of each key F1-F7, the following modes are set or the following processes are executed.

F1 key operation (YES in S63)

An acceptance mode of machine type registration is set (S65). That is, new registration of machine type name, the number of items of element data, a name of each element data, a standard threshold value of each element data, a standard threshold value of each counter, etc. are accepted.

F2 key operation (YES in S67)

A registration acceptance mode of a user master is set (S69). That is, new registration of a name of user, address, telephone number, machine type name, machine number, date and time of fixed time transmission, etc. are accepted. Also, the DTID is automatically set.

F3 key operation (YES in S71)

The trouble conditions are displayed (S73). That is, user information (a name of the user, address, telephone number, a machine type name) of a copying machine of trouble transmission, date and hour of occurrence and so forth are displayed in display 92 together with contents of the trouble. The number of trouble cases is always displayed in a corner portion of display 92 without any connection with operation of F3 key.

F4 key operation (YES in S75)

A warning condition is displayed (S77). That is, user information and so forth of a copying machine of the warning transmission are displayed in display 92 together with the contents of the warning. The number of warning cases is always displayed in a corner portion of display 92 without any connection with operation of the F4 key.

F5 key operation (YES in S79)

A not-received condition is displayed (S81). That is, user information of a copying machine which does not make fixed time transmission even after a predetermined fixed time transmission time is displayed in display 92. The number of no receipt cases is always displayed in a corner portion of display 92 without any connection with operation of the F4 key.

F6 key operation (YES in S83)

A display mode for user data is implemented (S85). That is, when a user is selected, user information is displayed in display 92. Also, if a sub menu is selected, count values of various counters of the copying machine of the particular user (a total counter, a counter for each paper size, a JAM counter, a trouble counter, a PM counter) and element data are displayed for every month or for every item.

F7 key operation (YES in S87)

A bill is printed out (S89). For example, an amount asked is calculated on the basis of a count value of the total counter and a predetermined calculation expression, and printer 94 is activated to print it out.

Figure 18:
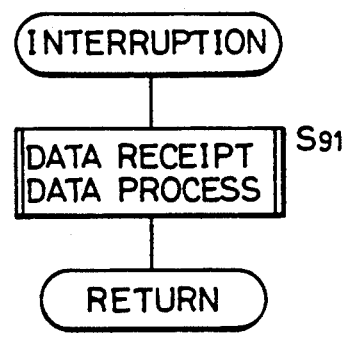
FIG. 18 is a flow chart showing an interruption process for the controlling CPU of the centralized control unit of FIG. 1.
Figure 19:
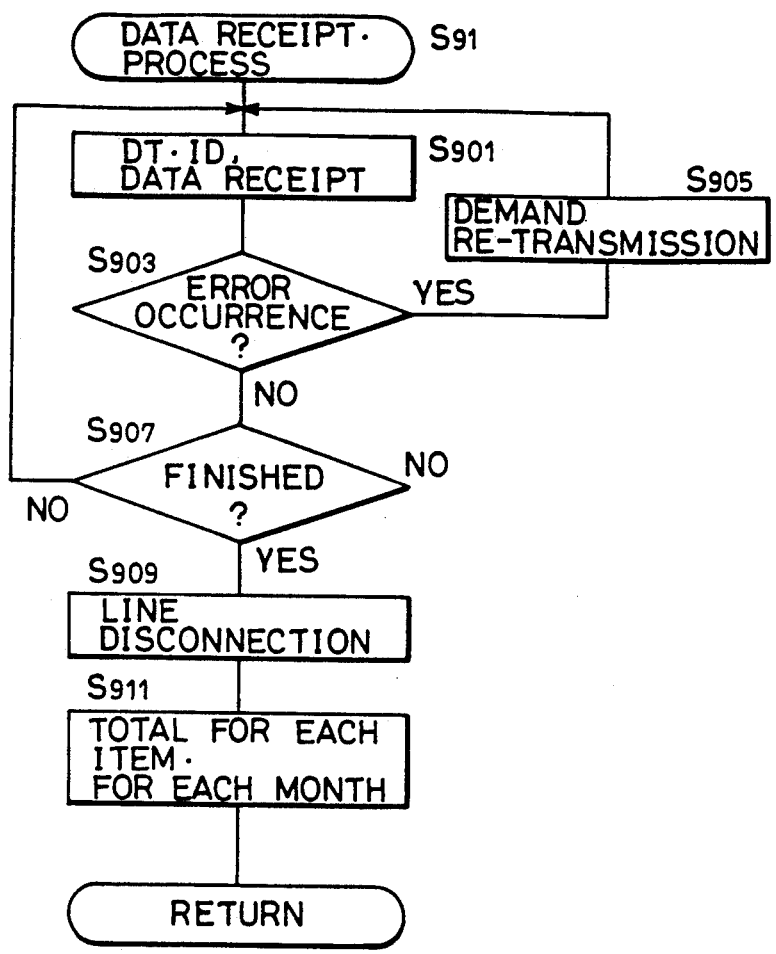
FIG. 19 is a flow chart showing specific contents of the data receipt process routine of FIG. 18.

(b) Interruption Process (FIGS. 18 and 19)

CPU 91 receives data transmitted from a DT by an interruption process, and also applies a predetermined process to the received data (S91).

First, when an interruption is produced on the DT side, CPU 91 receives a DTID and transmission data (S901).

When a communication error occurs (YES in S903), CPU 91 requests retransmission of the DTID and the transmission data to the DT side (S905).

When the communication is normally finished (YES in S907), CPU 91 disconnects the line (S909), finds a total for each item, for each month, and produces data for screen display by an operator selection (S911).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus collecting data related to a copying machine and communicating with a centralized control unit on the basis of the collected data, comprising:
   communication means for calling said centralized control unit;
   first control means for activating said communication means when a predetermined transmission condition is satisfied, said predetermined transmission condition including one with high priority and one with low priority;
   determination means for determining that connection with said centralized control unit cannot be made in spite of the fact that said communication means is activated;
   differentiating means for differentiating a priority of said predetermined transmission condition in response to an output of said determination means;
   setting means for setting retransmission time on the basis of a random number from a predetermined time period when it is differentiated by said differentiating means that the priority of said predetermined transmission condition is low;
   timer means for counting the present time; and
   second control means for having said communication means call said centralized control unit again when the present time becomes the redialing time.

2. The control apparatus according to claim 1, wherein said predetermined transmission condition with low priority is satisfied when the present time comes to a predetermined time set in advance.

3. The control apparatus according to claim 1, wherein said transmission condition with high priority is satisfied when a trouble occurs.

4. The control apparatus according to claim 1, further comprising second setting means for setting a retransmission time which is a predetermined time period after the present time when it is decided by said differentiating means that the priority of said predetermined transmission condition is high.

5. A control apparatus collecting data related to a copying machine and communicating with a centralized control unit on the basis of the collected data, comprising:

communication means for calling said centralized control unit;

first control means for activating said communication means when a predetermined transmission condition is satisfied, said predetermined transmission condition including one with high priority and one with low priority;

determination means for determining that connection with said centralized control unit can not be made in spite of activation of said communication means;

second control means for having said communication means call said centralized control unit again in response to an output of said determining means;

differentiating means for differentiating the priority of said predetermined transmission condition;

deciding means for deciding that the number of times of calling said centralized control unit of said communication means controlled by said second control means exceeds a predetermined calling number of times corresponding to priority of said predetermined transmission condition; and third control means for forbidding operation of said second control means in response to an output of said decided means.

6. The control apparatus according to claim 5, wherein said predetermined number of times of calling includes a first value for a predetermined transmission condition with high priority and a second value for a predetermined transmission condition with low priority.

7. The control apparatus according to claim 6, wherein said first value of said predetermined times of calling is larger than the second value.

8. The control apparatus according to claim 5, wherein said predetermined transmission condition with low priority is satisfied when the present time becomes a predetermined time set in advance.

9. The control apparatus according to claim 5, wherein said transmission condition with high priority is satisfied when a trouble occurs.

10. The control apparatus according to claim 5, wherein said second control means comprises setting means for setting a retransmission time on the basis of a random number from a predetermined time period.

11. The control apparatus according to claim 5, wherein said second control means comprises setting means for setting a predetermined time period after the present time as a retransmission time.

* * * * *